(12) United States Patent
Nakamura

(10) Patent No.: US 7,440,142 B2  
(45) Date of Patent: Oct. 21, 2008

(54) IMAGE PROCESSING SYSTEM WITH MULTI-VALUED PROCESSING

(75) Inventor: Takahiko Nakamura, Ami-machi (JP)

(73) Assignee: Riso Kagaku Corporation, Tokyo (JP)

( * ) Notice: Subject to any disclaimer, the term of this patent is extended or adjusted under 35 U.S.C. 154(b) by 729 days.

(21) Appl. No.: 11/081,311

(22) Filed: Mar. 16, 2005

(65) Prior Publication Data

US 2005/0206931 A1    Sep. 22, 2005

(30) Foreign Application Priority Data

Mar. 18, 2004    (JP)    ............... 2004-077652

(51) Int. Cl.  
G06K 15/00 (2006.01)  
G03F 3/08 (2006.01)

(52) U.S. Cl. ............ 358/3.21; 358/3.14; 358/521

(58) Field of Classification Search ........... 358/3.21, 358/3.01, 533, 534, 521, 3.13, 3.14  
See application file for complete search history.

(56) References Cited

U.S. PATENT DOCUMENTS 5,640,249 A    6/1997    Rao et al.

OTHER PUBLICATIONS

"Digital Color Halftoning" by Henry R. Kamg, IEEE Press, SPIE ISBNO-8194-3318-7, pp. 445-449, Nov. 1, 1999.

*Primary Examiner*—King Poon  
*Assistant Examiner*—William C Storey  
(74) *Attorney, Agent, or Firm*—Matthew K. Ryan; Frommer Lawrence & Haup LLP

(57) ABSTRACT

An image processing system receives an input gradient number m, input image data I(x,y) whose input gradient number is m, and an output gradient number n and calculates output image data O(x,y) having an output gradient number of n on the basis of the following formula (1).

$$O(x,y) = int[\alpha + d(xd, yd)/(gmax+1)] \quad (1)$$

When α is an integer, the output image data O(x,y) is calculated on the basis of a formula obtained by substituting the calculated α' for α in the above formula (1), whereas when α is not an integer, the output image data O(x,y) is calculated on the basis of the above formula (1).

2 Claims, 5 Drawing Sheets

FIG.2

| 0 | 20 | 12 | 3 | 23 | 15 |
|---|----|----|---|----|----|
| 32 | 16 | 24 | 35 | 19 | 27 |
| 8 | 28 | 4 | 11 | 31 | 7 |
| 2 | 22 | 14 | 1 | 21 | 13 |
| 34 | 18 | 26 | 33 | 17 | 25 |
| 10 | 30 | 6 | 9 | 29 | 5 |

IMAGE PROCESSING SYSTEM WITH MULTI-VALUED PROCESSING

BACKGROUND OF THE INVENTION

1. Field of the Invention

This invention relates to an image processing system which outputs output image data having an output gradient number of n lower than the input gradient number m by carrying out multi-valued processing using a dither matrix on input image data having an input gradient number of m.

2. Description of the Related Art

When image data representing information of an image created by a personal computer or image data obtained by reading an original with a scanner or the like is to be output to a printer to be printed thereby or to a display to be displayed thereby, processing to conform the image data to the lower number of gradation of the output side and to have the same gradation as the information of the image or the original in appearance is generally carried out on the image data since the number of gradation of the output side device, the printer or the display, is lower than that of the information of the image created by the personal computer or the image data read-out by the scanner.

For example, when the multi-valued image data created by the personal computer is to be printed by a two-valued printer, an organizational dither method is employed. The organizational dither method is a method in which n×n pixels are considered to be the smallest unit of expressing the gradation, and a n×n matrix of threshold values (will be referred to as "a dither matrix", hereinbelow) corresponding thereto is prepared, and the dither matrix is superposed on the image data as a kind of mask, whereby the density of each pixel is compared with the corresponding threshold value and "1" is output when the former is larger than the latter while "0" is output when the former is smaller than the latter. Then after the same processing is finished on a group of n×n pixels, the dither matrix is moved to another group of n×n pixels and the same processing is repeated, whereby each components of the whole image data is turned to one of the two values, "1" or "0".

Further, when each pixel is turned to one of the multi-values (multi-valued) in place of the two values, there is proposed, in U.S. Pat. No. 5,640,249 (will be referred to as "the first paper", hereinbelow.), a method where the density of each pixel is compared with a plurality of threshold values. For example, a plurality of dither matrices each having a threshold value necessary to the multi-valued processing (turning the density of each pixel to the multi-values) are prepared from one basic dither matrix, and the density of each pixel is multi-valued by comparing the density of each pixel with a plurality of threshold values on the same coordinates in a plurality of dither matrices. That is, in accordance with the first paper, (x−1) comparisons are necessary when the number of gradations into which each pixel is to be multi-valued is x.

Whereas, in "Digital Color Halftoning" by Henry R. Kang., IEEE PRESS, SPIE ISBNO-8194-3318-7, pp. 445-449, 1999/11/1 (will be referred to as "the second paper", hereinbelow.), there is disposed a method where multi-valued processing can be realized by one comparison. More particularly, the method disclosed in the second paper is a method of obtaining output image data O(x,y) by the use of the following formula (3). Since the multi-valued processing can be executed according to one formula without using comparison operation, the method of the second paper can be executed at a higher speed as compared with the method of the first paper.

Further, the method of the second paper requires less memory capacity for storing the dither matrix as compared with the method of the first paper where a plurality of dither matrices are used.

$$O(x,y)=int[\alpha+d(xd,yd)/(gmax+1)] \quad (3)$$

wherein $\alpha=(n-1)/(m-1)*I(x,y)$, n represents output gradient number, m represents input gradient number, O(x,y) represents output image data $(0 \leq O(x,y) \leq (n-1))$, I(x,y) represents input image data $(0 \leq I(x,y) \leq (m-1))$, gmax represents the maximum value of the dither matrix, d(xd,yd) represents the value of the dither matrix $(0 \leq d(xd,yd) \leq gmax)$, xd=x mod dsize_x, yd=y mod dsize_y, dsize_x represents the size of the dither matrix in x direction, dsize_y represents the size of the dither matrix in y direction, and int[ ] is an integer-valued function.

However, if the method disclosed in the first paper is employed, there arises a problem that, for instance, when a gradation image is to be output, the image data components at a particular density can be processed to one gradation and output in the gradation though the image data components at almost all the densities can be processed to two gradations and output in the gradations. The result obtained by carrying out the multi-valued processing on a gradation image by the use of, for instance, the dot dispersion type dither matrix and the above formula is shown in FIG. 5. As shown in FIG. 5, though, in a lateral view, almost all the regions are expressed in two different gradations, a region which is expressed in a single gradation exists near the center. When such an image is output, e.g., printed, though almost all the regions have a feeling of granulated material, the region expressed in a single gradation has no feeling of granulated material, whereby people visually feel as if there is different material in the region, and will feel unnatural.

SUMMARY OF THE INVENTION

In view of the foregoing observations and description, the primary object of the present invention is to provide an image processing system which, in outputting output image data having an output gradient number of n lower than the input gradient number m by carrying out multi-valued processing using a dither matrix on input data having an input gradient number of m, can execute the multi-valued processing at a higher speed and can remove the above described feeling of unnaturalness from the output image.

In accordance with the present invention, there is provided a first image processing system having an output image calculating means which receives an input gradient number m, input image data I(x,y) whose input gradient number is m, and an output gradient number n and calculates output image data O(x,y) having an output gradient number of n on the basis of the following formula (1), $$O(x,y)=int[\alpha+d(xd,yd)/(gmax+1)] \quad (1)$$

wherein $\alpha=(n-1)/(m-1)*I(x,y)$, gmax represents the maximum value of the dither matrix, d(xd,yd) represents the value of the dither matrix $(0 \leq d(xd,yd) \leq gmax)$, xd=x mod dsize_x, yd=y mod dsize_y, dsize_x represents the size of the dither matrix in x direction, and dsize_y represents the size of the dither matrix in y direction, wherein the improvement comprises correction determining means which calculates $\alpha$ in the formula (1) on the basis of the input gradient number m, input image data I(x,y), and the output gradient number n and determines whether the calculated α is an integer, a correction means which makes a correction to make the calculated α not an integer to calculate α' when the correction determining means determines that the calculated α is an integer, and an operation control means which controls the output image calculating means to calculate the output image data O(x,y) on the basis of a formula obtained by substituting the calculated α' for α in the above formula (1) when the correction determining means determines that the calculated α is an integer, whereas to calculate the output image data O(x,y) on the basis of the above formula (1) when the correction determining means determines that the calculated α is not an integer.

In accordance with the present invention, there is provided a second image processing system having an output image calculating means which receives an input gradient number m, input image data I(x,y) whose input gradient number is m, and an output gradient number n and calculates output image data O(x,y) having an output gradient number of n on the basis of the following formula (1), $$O(x,y)=int[\alpha+d(xd,yd)/(gmax+1)] \quad (1)$$

wherein $\alpha=(n-1)/(m-1)*I(x,y)$, gmax represents the maximum value of the dither matrix, d(xd,yd) represents the value of the dither matrix ($0 \leq d(xd,yd) \leq gmax$), xd=x mod dsize_x, yd=y mod dsize_y, dsize_x represents the size of the dither matrix in x direction, and dsize_y represents the size of the dither matrix in y direction, wherein the improvement comprises correction determining means which determines whether β calculated according to the following formula (2) is an integer on the basis the input gradient number m, the output gradient number n and a prospective input image value K which the input image data I(x,y) can take, for each value of the prospective input image value K, and obtains in advance the result of determination for each value of the prospective input image value K, a correction means which makes a correction to make β not an integer to calculate β' when the correction determining means determines that β is an integer, and an operation control means which controls the output image calculating means to calculate the output image data O(x,y) on the basis of a formula obtained by substituting β' calculated by the correction means for α in the above formula (1) when the input image data I(x,y) received by the output image calculating means is of one of the values of the prospective input image value K for which the correction determining means determines that β is an integer, whereas to calculate the output image data O(x,y) on the basis of a formula obtained by substituting β for α in the above formula (1) or the above formula (1) when the input image data I(x,y) received by the output image calculating means is not of one of the values of the prospective input image value K for which the correction determining means determines that β is an integer.

$$\beta=(n-1)/(m-1)*K \quad (2)$$

Here the "input image data I(x,y)" means data of pixels which form an image input into the image processing system, and the "output image data O(x,y)" means data of pixels which form an image output from the image processing system.

Further, the correction means may calculate as the above α' a value which satisfies α<α'<α+1 or α−1<α'<α for α which is determined to be an integer by the correction determining means.

Further, the correction means may calculate as the above β' a value which satisfies β<β'<β+1 or β−1<β'<β for β which is determined to be an integer by the correction determining means.

The "prospective input image value K" means any one of integers from 0 to 255 when, for instance, the input gradient number m is 256.

Further, the "int[]" described above means an integer-valued function which omits the figures below the decimals of the values obtained by the formula in the brackets and gives an integer.

The "mod" described above means a function which divides a value and gives the remainder.

In accordance with the first image processing system of the present invention, α in the following formula (1) is calculated on the basis of the input gradient number m, the input image data I(x,y), and the output gradient number n and whether the value of α is integer is determined. A correction to make the calculated α not an integer is made and α' is calculated when the calculated α is determined to be an integer. When the calculated α is determined to be an integer, the output image data O(x,y) is calculated on the basis of a formula obtained by substituting the calculated α' for α in the following formula (1), and when the calculated α is determined to be an integer, the output image data O(x,y) is calculated on the basis of the following formula (1). Accordingly, even if the input image is a gradation image, the output image can be free of the unnaturalness described above.

$$O(x,y)=int[\alpha+d(xd,yd)/(gmax+1)] \quad (1)$$

wherein $\alpha=(n-1)/(m-1)*I(x,y)$, gmax represents the maximum value of the dither matrix, d(xd,yd) represents the value of the dither matrix ($0 \leq d(xd,yd) \leq gmax$), xd=x mod dsize_x, yd=y mod dsize_y, dsize_x represents the size of the dither matrix in x direction, and dsize_y represents the size of the dither matrix in y direction.

In accordance with the second image processing system of the present invention, whether β calculated according to the following formula (2) is an integer on the basis the input gradient number m, the output gradient number n and a prospective input image value K which the input image data I(x,y) can take, for each value of the prospective input image value K, and obtains in advance the result of determination for each value of the prospective input image value K. A correction to make the calculated β not an integer is made and β' is calculated when the calculated β is determined to be an integer. The output image data O(x,y) is calculated on the basis of a formula obtained by substituting β' calculated by the correction means for α in the above formula (1) when the input image data I(x,y) received by the output image calculating means is of one of the values of the prospective input image value K for which the correction determining means determines that β is an integer, whereas the output image data O(x,y) is calculated on the basis of a formula obtained by substituting β for α in the above formula (1) or the above formula (1) when the input image data I(x,y) received by the output image calculating means is not of one of the values of the prospective input image value K for which the correction determining means determines that β is an integer. Accordingly, substantially the same effect as in the first image processing system can be obtained. Further, in contrast with the first image processing system where determination whether α is integer must be made a number of times equal to the number of pixels in the input image, in the second image processing means, determination whether $\beta$ is integer may be made only a number of times equal to the number which the input data can take.

$$O(x,y)=int[\alpha+d(xd,yd)/(gmax+1)] \quad (1)$$

wherein $\alpha=(n-1)/(m-1)*I(x,y)$, gmax represents the maximum value of the dither matrix, $d(xd,yd)$ represents the value of the dither matrix $(0 \leq d(xd,yd) \leq gmax)$, xd=x mod dsize_x, yd=y mod dsize_y, dsize_x represents the size of the dither matrix in x direction, and dsize_y represents the size of the dither matrix in y direction.

$$\beta=(n-1)/(m-1)*K \quad (2)$$

BRIEF DESCRIPTION OF THE DRAWINGS

FIG. 2 is a view showing an example of the dither matrix employed in the image processing system shown in FIG. 1.

DESCRIPTION OF THE PREFERRED EMBODIMENTS

Figure 1:
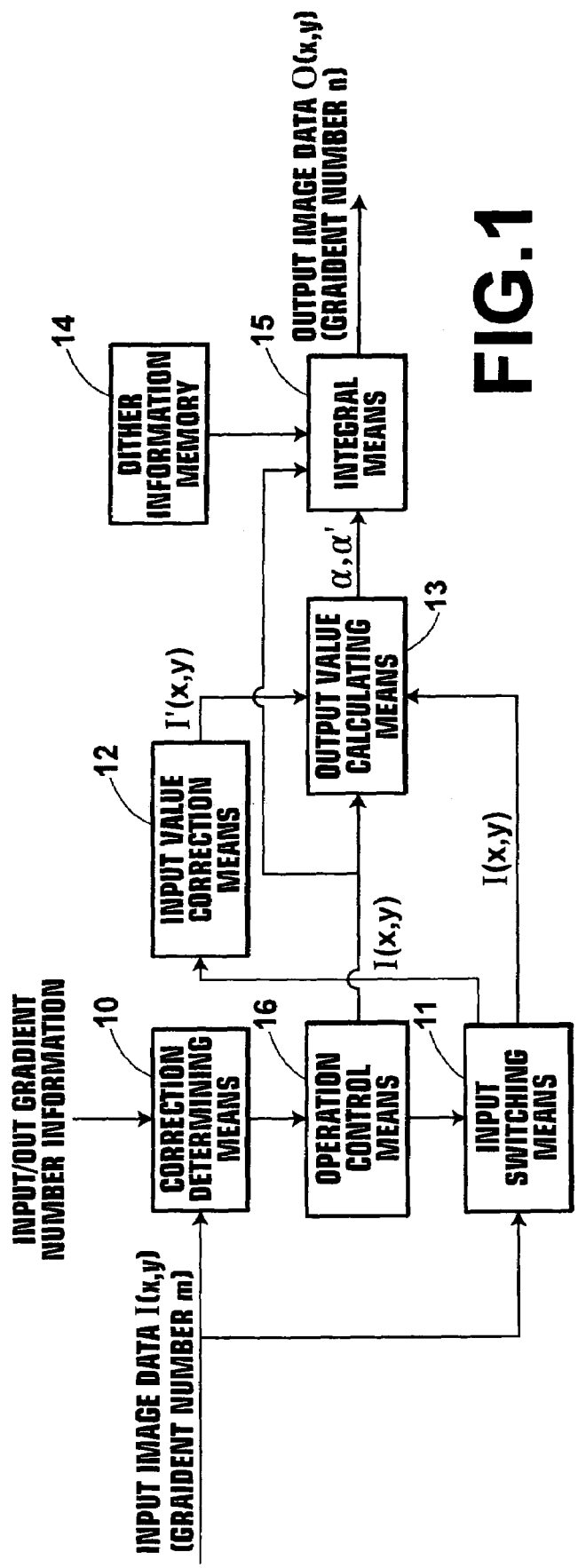
FIG. 1 is a block diagram showing an image processing system in accordance with a first embodiment of the present invention.

In FIG. 1, an image processing system in accordance with an embodiment of the present invention receives input image data I(x,y) whose input gradient number is m, and outputs image data O(x,y) having an output gradient number of n lower than the input gradient number m by carrying out multi-valued processing using a dither matrix on input image data I(x,y).

As shown in FIG. 1, the image processing system of this embodiment comprises a correction determining means 10 which receives an input gradient number, input image data, and an output gradient number and determines whether a correction is necessary upon multi-valued processing on the basis of the input gradient number, the input image data, and the output gradient number received, an input switching means 11 which outputs the input image data to an input value correction means 12 (to be described later) when the correction determining means 10 determines that a correction is necessary and to an output value calculating means 13 (to be described later) when the correction determining means 10 determines that a correction is unnecessary, the input value correction means 12 which, when the correction determining means 10 determines that a correction is necessary, determines a correction value $\delta$ to be used in the correction and outputs corrected input image data I'(x,y) which has been obtained by carrying out a correction on the basis of the correction value $\delta$ on the input image data I(x,y), the output value calculating means 13 which carries out operation processing on the corrected input image data output from the input value correction means 12 or the input image data output from the input switching means 11 and outputs it, a dither information memory 14 in which dither matrices are stored, an integral means 15 which carries out multi-valued processing on the result of operation processing output from the output value calculating means 13 by the use of the dither matrices stored in the dither information memory 14 and outputs it as output image data, and an operation control means 16 which controls the input switching means 11, the output value calculating means 13 and the integral means 15 on the basis of the determination by the correction determining means 10.

The correction determining means 10 determines whether a correction is necessary upon multi-valued processing on the basis of whether $\alpha$ given by the following formula (4) is an integer. The correction determining means 10 determines that a correction is necessary when $\alpha$ is an integer, whereas determines that a correction is unnecessary when $\alpha$ is not an integer. When the value of (n-1) is a factor of (m-1) or a multiple of a factor of (m-1), $\alpha$ can be an integer. The reason why the cases where I(x,y) is 0 and I(x,y) is m-1 are omitted in the following formula (4) is because there appears no joint described above when the input image is at the maximum density and the minimum density. The correction determining means 10 outputs a signal which represents that a correction is necessary or a signal which represents that a correction is unnecessary to the operation control means 16.

$$\alpha=(n-1)/(m-1)*I(x,y), 0<I(x,y)<(m-1) \quad (4)$$

The input value correction means 12 sets $\delta$ which satisfies the following formula (5) upon receipt of the input image data output from the input switching means 11 and calculates corrected input image data I'(x,y) according to the following formula (6).

$$-(m-1)<\delta<m-1, \delta\neq 0 \quad (5)$$

$$I'(x,y)=I(x,y)+\delta/(n-1) \quad (6)$$

The output value calculating means 13 calculates $\alpha$ according to the following formula (7) when the input image data I(x,y) output from the input switching means 11 is input, whereas calculates $\alpha'$ according to the following formula (8) when the corrected input image data I'(x,y) output from the input value correction means 12 is input.

$$\alpha=(n-1)/(m-1)*I(x,y) \quad (7)$$

$$\alpha'=(n-1)/(m-1)*I'(x,y) \quad (8)$$

Though the output value calculating means 13 calculates $\alpha'$ according to the above formula (8) on the basis of the corrected input image data I'(x,y) output from the input value correction means 12 in this embodiment, the input value correction means 12 may carry out only setting of the correction value $\delta$ while the correction value $\delta$ and the input image data I(x,y) are output from the input value correction means 12 to the output value calculating means 13 and the output value calculating means 13 calculates $\alpha'$ according to the following formula (9) in place of calculating $\alpha'$ after calculating the corrected input image data by the input value correction means 12.

$$\alpha'=((n-1)*I(x,y)+\delta)/(m-1) \quad (9)$$

The dither information memory 14 stores, for instance, a plurality of dither matrices each having a plurality of (6×6) threshold values as shown in FIG. 2. Depending on the method of preparing the dither matrices, a halftone image, a dot dispersion type image or an error dispersion type image (a blue noise mask is used) can be output.

The integral means 15 outputs integral output image data satisfying the following formula (10) on the basis of $\alpha$ or $\alpha'$ output from the output value calculating means 13 and the dither matrices stored by the dither information memory 14.

$$O(x,y)=int[\alpha+d(xd,yd)/(gmax+1)]$$

$$O(x,y)=int[\alpha'+d(xd,yd)/(gmax+1)] \quad (10)$$

wherein gmax represents the maximum value of the dither matrix, $d(xd,yd)$ represents the value of the dither matrix ($0 \leq d(xd,yd) \leq gmax$), $xd = x \bmod dsize\_x$, $yd = y \bmod dsize\_y$, $dsize\_x$ represents the size of the dither matrix in x direction, and $dsize\_y$ represents the size of the dither matrix in y direction.

In the embodiment described above, the input value correction means 12 and the output value calculating means 13 correspond to the correction means as mentioned in claim 1 and the dither information memory 14 and the integral means 15 correspond to the output image calculating means as mentioned in claim 1.

Operation of the image processing system with the above structure will be described, hereinbelow.

Input image data $I(x,y)$ whose input gradient number is m, the input gradient number (=m) of the input image data $I(x,y)$ and an output gradient number n are first input into the correction determining means 10. The correction determining means 10 calculates $\alpha$ according to the above formula (4), and determines whether the $\alpha$ obtained is an integer. When the $\alpha$ obtained is an integer, the correction determining means 10 outputs a signal representing that a correction is necessary to the operation control means 16. When the $\alpha$ obtained is not an integer, the correction determining means 10 outputs a signal representing that a correction is unnecessary to the operation control means 16. When the value of $(n-1)$ is a factor of $(m-1)$ or a multiple of a factor of $(m-1)$, $\alpha$ can be an integer. For example, when the input gradient number m=256 and the output gradient number n=4, $(n-1)=3$ is included in factors of $(m-1)=255$ and accordingly, $\alpha$ can be an integer. When the input gradient number m=256 and the output gradient number n=7, $(n-1)=6$ is a multiple of a factor 3 of $(m-1)=255$ and accordingly, $\alpha$ also can be an integer. If $I(x,y)=85$ or 170 when m=256 and n=4, $\alpha$ is an integer and $\alpha=1$, and 2, respectively.

Upon receipt of the signal representing that a correction is necessary from the correction determining means 10, the operation control means 16 controls the input switching means 11 to output the input image data $I(x,y)$ to the input value correction means 12. The input value correction means 12 sets $\delta$ which satisfies the above formula (5) upon receipt of the input image data $I(x,y)$ output from the input switching means 11 and calculates corrected input image data $I'(x,y)$ according to the above formula (6). Then the input value correction means 12 outputs the corrected input image data $I'(x,y)$ to the output value calculating means 13. Upon receipt of the signal representing that a correction is unnecessary from the correction determining means 10, the operation control means 16 controls the input switching means 11 to output the input image data $I(x,y)$ to the output value calculating means 13.

The output value calculating means 13 calculates $\alpha$ according to the above formula (7) when the input image data $I(x,y)$ output from the input switching means 11 is input, whereas calculates $\alpha'$ according to the above formula (8) when the corrected input image data $I'(x,y)$ output from the input value correction means 12 is input and outputs $\alpha$ or $\alpha'$ to the integral means 15.

The operation control means 16 controls so that the integral means 15 calculates integral output image data $O(x,y)$ satisfying the above formula (10) on the basis of $\alpha$ output from the output value calculating means 13 and the dither matrices stored by the dither information memory 14 and outputs it, upon receipt of the signal representing that a correction is unnecessary from the correction determining means 10, and so that the integral means 15 calculates integral output image data $O(x,y)$ satisfying the above formula (10) on the basis of $\alpha'$ output from the output value calculating means 13 and the dither matrices stored by the dither information memory 14 and outputs it, upon receipt of the signal representing that a correction is necessary from the correction determining means 10.

Since neither $\alpha$ nor $\alpha'$ input to the integral means 15 is an integer, the integral means 15 outputs $\alpha$ or $\alpha+1$, or $\alpha'$ or $\alpha'+1$ depending on the value of $d(xd,yd)/(gmax+1)$ in the above formula (10).

In the image processing system in accordance with the first embodiment of the present invention described above, since $\alpha$ in the above formula (4) is calculated on the basis the input gradient number m, the input image data $I(x,y)$ and the output gradient number n, and when it is determined that the $\alpha$ is an integer, the $\alpha$ is corrected not to be an integer to calculate $\alpha'$ and the output image calculating means calculates the output image data $O(x,y)$ on the basis of a formula obtained by substituting the calculated $\alpha'$ for $\alpha$ in the above formula (10), whereas when it is determined that the $\alpha$ is not an integer, the output image calculating means calculates the output image data $O(x,y)$ on the basis of the above formula (10), an output image closer to the input image in tone change can be output. Accordingly, even if the input image is a gradation image, the output image can be free of the unnaturalness described above.

Figure 3:
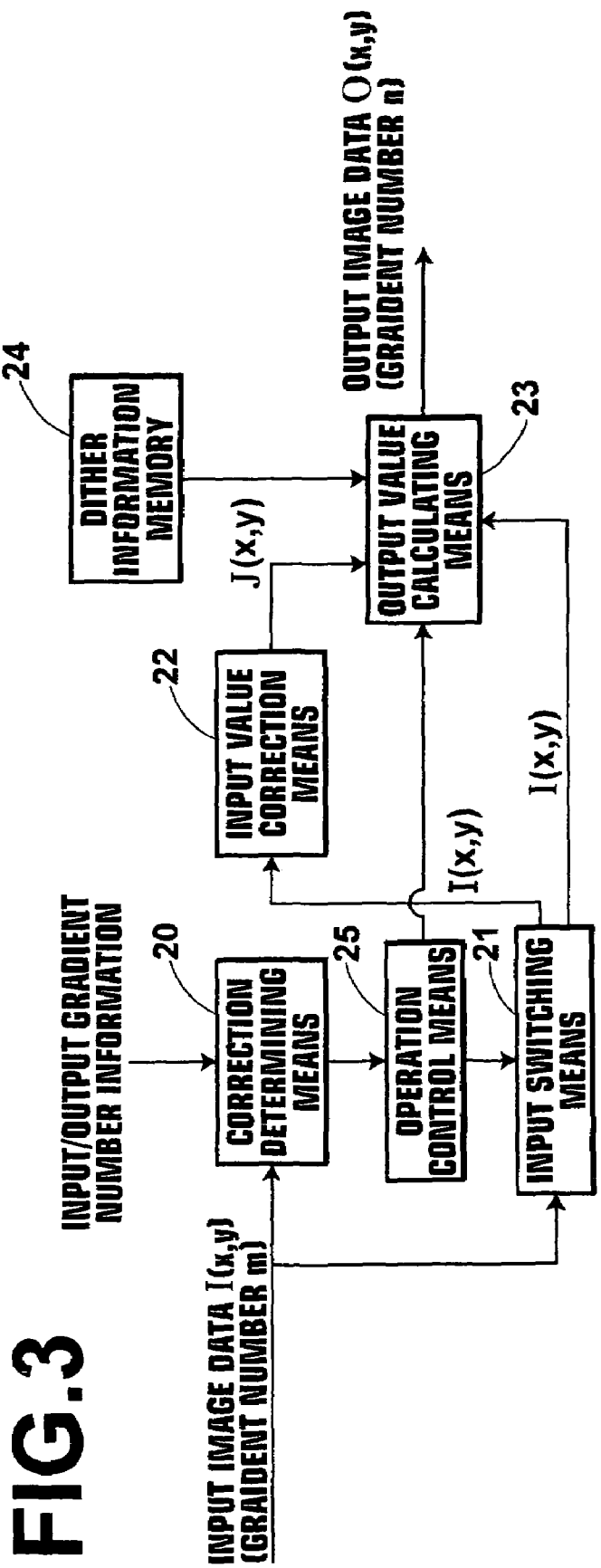
FIG. 3 is a block diagram showing an image processing system in accordance with a second embodiment of the present invention.

An image processing system in accordance with a second embodiment of the present invention will be described, hereinbelow. FIG. 3 is a block diagram showing the image processing system in accordance with the second embodiment of the present invention. As shown in FIG. 3, the image processing system of this embodiment is substantially the same as that of the first embodiment except that change to increase the calculating speed and to reduce the size of the operating program is add to the way of operation.

The action of the correction determining means 20 and the input switching means 21 is the same as that in the first embodiment. The input value correction means 22, upon receipt of the input image data output from the input switching means 21, sets a correction value $\epsilon$ which satisfies the following formula (11) and calculates corrected input image data $J(x,y)$ on the basis of the following formula (12). Then the input value correction means 22 outputs it to the output value calculating means 23.

$$-(n-1)<\epsilon<n-1, \epsilon\neq 0, \epsilon=integer \quad (11)$$

$$J(x,y)=(n-1)*I(x,y)+\epsilon \quad (12)$$

Since formula (12) is obtained by multiplying by $(n-1)$ the whole formula (6), the corrected input image data $J(x,y)$ calculated on the basis of formula (12) is equal to the value obtained by multiplying the input image data by $(n-1)$ and adding correction value $\epsilon$ thereto.

The output value calculating means 23 simultaneously executes the functions of the output value calculating means 13 and the integral means 15 in the first embodiment. The output value calculating means 23 calculates output image data $O(x,y)$ according to the following formula (13) on the basis of $J(x,y)$ output from the input value correction means 22 or the input image data $I(x,y)$ output from the input switching means 21 and the dither matrices stored by the dither information memory 24 and outputs it.

$$O(x,y)=\{J(x,y)(gmax+1)+d(xd,yd)*(m-1)\}/\{(m-1)(gmax+1)\}$$

$$O(x,y)=\{I(x,y)*(gmax+1)*(n-1)+d(xd,yd)*(m-1)\}/\{(m-1)*(gmax+1)\} \quad (13)$$

wherein, gmax represents the maximum value of the dither matrix, $d(xd,yd)$ represents the value of the dither matrix ($0 \leq d(xd,yd) \leq gmax$), xd=x mod dsize_x, yd=y mod dsize_y, dsize_x represents the size of the dither matrix in x direction, and dsize_y represents the size of the dither matrix in y direction.

Though the value of the output image data $O(x,y)$ output from the output value calculating means 23 is the same as that output from the integral means 15 in the first embodiment, the calculating speed is increased and the size of the operating program and the memory size are reduced in this embodiment by reducing division to increase addition or subtraction, and increasing integer arithmetic in place of floating-point arithmetic.

Figure 4:
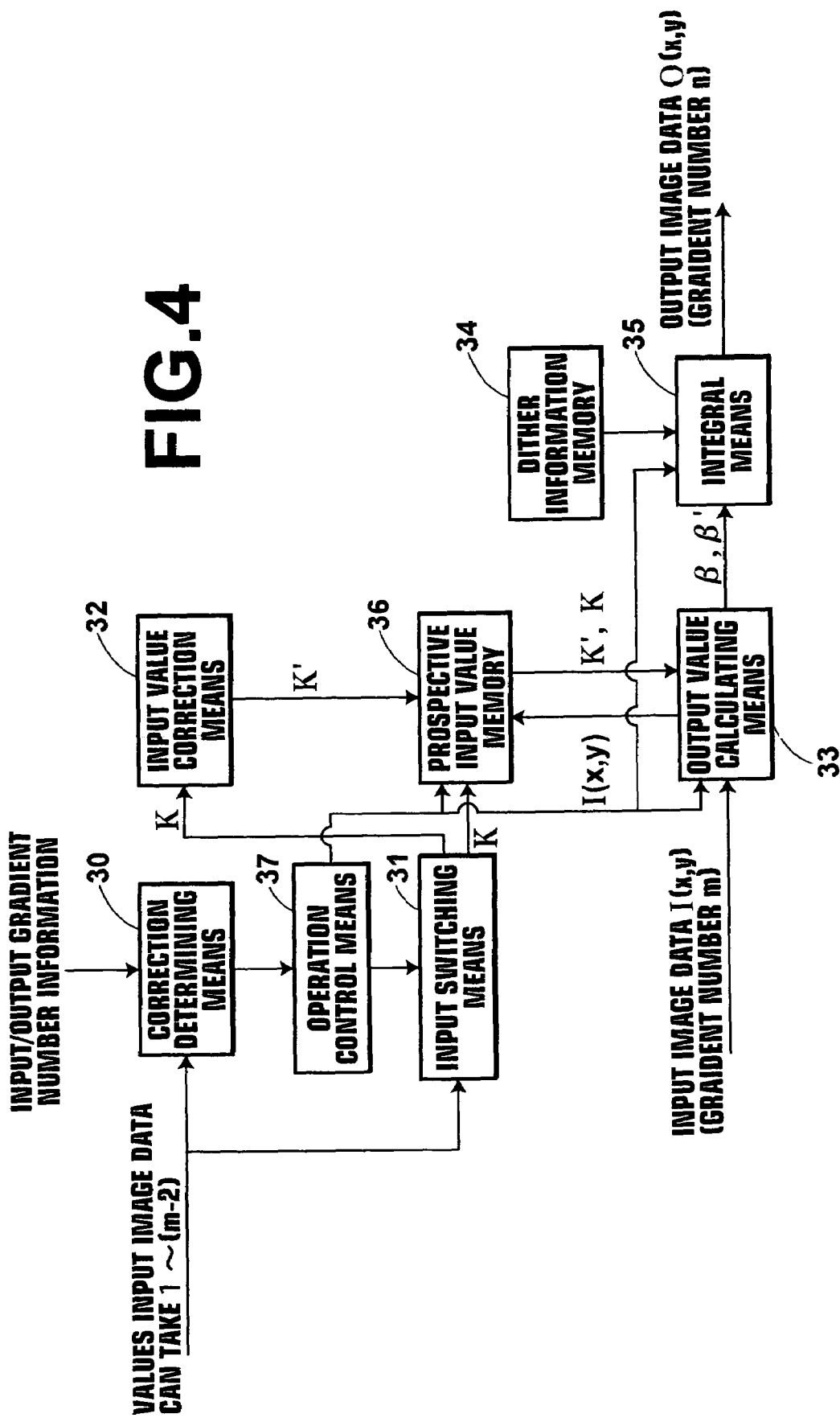
FIG. 4 is a block diagram showing an image processing system in accordance with a third embodiment of the present invention.
Figure 5:
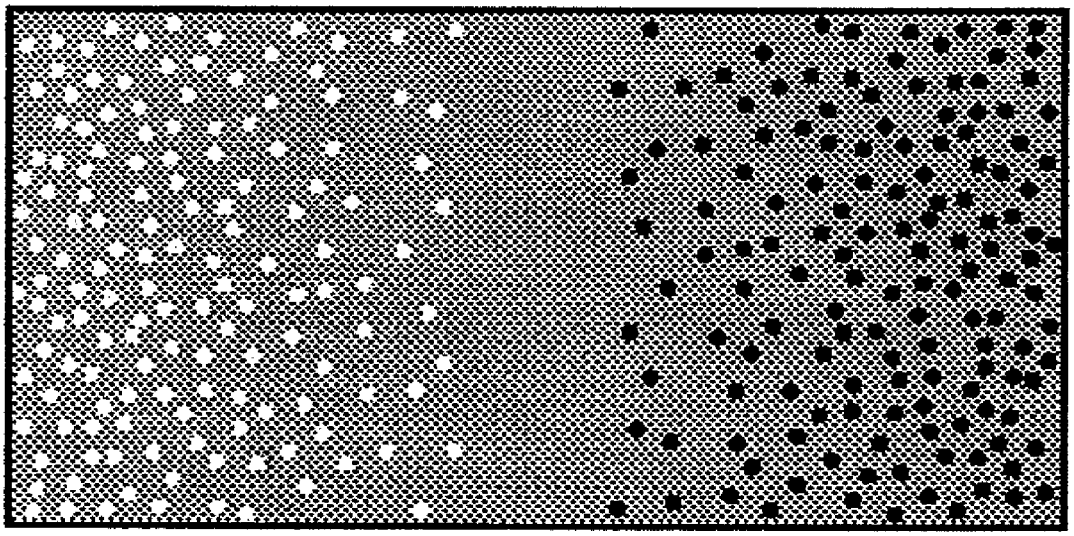
FIG. 5 is a view showing an example of the output image which has been multi-valued by a conventional image processing system.

An image processing system in accordance with a third embodiment of the present invention will be described, hereinbelow. FIG. 4 is a block diagram showing the image processing system in accordance with the third embodiment of the present invention.

The correction determining means 30 determines whether the input image data is to be corrected when the multi-valued processing is executed thereon as the correction determining means 10 or 20 in the first or second embodiment of the present invention. However, the values which the input image data can take except the minimum and maximum values of the density are input into the correction determining means 30 in the third embodiment in place of the input image data $I(x,y)$. For example, when the input gradient number m=256, the values which the input image data can take are 0 to 255 and the values K from 0 to 255 except the minimum value 0 and the maximum value 255 are input into the correction determining means 30 in sequence. Then β is calculated on the basis of the following formula (14) and whether β is an integer is determined for each value of K.

$$\beta=(n-1)/(m-1)*K \quad (14)$$

When β is an integer, the correction determining means 30 outputs to the operation control means 37 a signal representing that a correction is necessary, whereas when β is not an integer, the correction determining means 30 outputs to the operation control means 37 a signal representing that a correction is unnecessary.

The operation control means 37 controls the input switching means 31 to output the value of K to the input value correction means 32 upon receipt of the signal representing that a correction is necessary. The input value correction means 32 sets δ which satisfies the following formula (15) upon receipt of the K output from the input switching means 31 and calculates a corrected prospective input image value K' according to the following formula (16). Then the input value correction means 32 outputs the corrected prospective input image value K' to a prospective input image value memory 36.

$$-(m-1)<\delta<m-1, \delta\neq 0 \quad (15)$$

$$K'=K+\delta/(n-1) \quad (16)$$

Upon receipt of the signal representing that a correction is unnecessary from the correction determining means 30, the operation control means 37 controls the input switching means 31 to output the prospective input image value K to the prospective input image value memory 36.

That is, the corrected prospective input image value K' or the prospective input image value K as it is, is stored in the prospective input image value memory 36 depending on the result of determination by the correction determining means 30.

Then, after the corrected prospective input image value K' or the prospective input image value K as it is, is stored in the prospective input image value memory 36 in the manner described above, input image data $I(x,y)$ whose input gradient number is m is input into the output value calculating means 33. The operation control means 37 causes the output value calculating means 33 to output the input image data $I(x,y)$ thus input to the prospective input image value memory 36 and obtains the prospective input image value K or the corrected prospective input image value K' corresponding to the input image data $I(x,y)$. Then the operation control means 37 causes the prospective input image value K or the corrected prospective input image value K' to be output to the output value calculating means 33. When the corrected prospective input image value K' corresponds to the input image data $I(x,y)$, the operation control means 37 causes the output value calculating means 33 to calculate β' on the basis of the following formula (17) and output it to the integral means 35.

$$\beta'=(n-1)/(m-1)+K' \quad (17)$$

When the prospective input image value K as it is corresponds to the input image data $I(x,y)$, the operation control means 37 causes the output value calculating means 33 to calculate β on the basis of the above formula (14) and output it to the integral means 35.

When β' is input into the integral means 35, the operation control means 37 controls so that the integral means 35 outputs integral output image data $O(x,y)$ satisfying the following formula (18) on the basis of the input β' and the dither matrices stored in the dither information memory 34. Whereas, when β is input into the integral means 35, the operation control means 37 controls so that the integral means 35 outputs integral output image data $O(x,y)$ satisfying the following formula (19) on the basis of the input β and the dither matrices stored in the dither information memory 34.

$$O(x,y)=int[\beta'+d(xd,yd)/(gmax+1)] \quad (18)$$

$$O(x,y)=int[\beta+d(xd,yd)/(gmax+1)] \quad (19)$$

wherein, gmax represents the maximum value of the dither matrix, $d(xd,yd)$ represents the value of the dither matrix ($0 \leq d(xd,yd) \leq gmax$), xd=x mod dsize_x, yd=y mod dsize_y, dsize_x represents the size of the dither matrix in x direction, and dsize_y represents the size of the dither matrix in y direction.

Though, in the third embodiment described above, the operation control means 37 causes the output value calculating means 33 to calculate β on the basis of the above formula (14) and output it to the integral means 35 when the prospective input image value K as it is corresponds to the input image data $I(x,y)$, the arrangement need not be limited to this and it is possible, when the prospective input image value K as it is corresponds to the input image data $I(x,y)$, to cause the output value calculating means 33 to calculate α according to the above formula (7), that is, on the basis of the output it to the integral means 35, and to cause the integral means 35 to calculate the output image data $O(x,y)$ according to the above formula (10).

By executing the operation as in the third embodiment, the operation processing of the input image data $I(x,y)$ and correction operation of the same can be executed separately from each other, which makes it feasible to execute the operation at very high speed when the input image formed by the input image data is large in size and the input gradient number is small. For example, in the case where the input gradient number m=256 and the input image is of A4, 600 dpi, the number of pixels forming the input image is 35 millions (5,000×7,000). In this case, determining processing must be carried out 35 million times in the image processing system of the first embodiment since whether a correction is necessary must be determined for each pixel therein, determining processing may be carried out only a number of times equal to the number of the values of K, i.e., 254 times, in the image processing system of the third embodiment.

Further, also in the image processing system of the third embodiment, the integral means 35 may be eliminated by the integral arithmetic as in the image processing system of the second embodiment.

What is claimed is:

1. An image processing system having an output image calculating means which receives an input gradient number m, input image data I(x,y) whose input gradient number is m, and an output gradient number n and calculates output image data O(x,y) having an output gradient number of n on the basis of the following formula (1), $$O(x,y)=int[\alpha+d(xd,yd)/(gmax+1)] \quad (1)$$

wherein $\alpha=(n-1)/(m-1)*I(x,y)$, gmax represents the maximum value of the dither matrix, d(xd,yd) represents the value of the dither matrix ($0\leq d(xd,yd)\leq gmax$), xd=x mod dsize_x, yd=y mod dsize_y, dsize_x represents the size of the dither matrix in x direction, and dsize_y represents the size of the dither matrix in y direction, wherein the improvement comprises correction determining means which calculates $\alpha$ in the formula (1) on the basis of the input gradient number m, input image data I(x,y), and the output gradient number n and determines whether the calculated $\alpha$ is an integer, a correction means which makes a correction to make the calculated $\alpha$ not an integer to calculate $\alpha'$ when the correction determining means determines that the calculated $\alpha$ is an integer, and an operation control means which controls the output image calculating means to calculate the output image data O(x,y) on the basis of a formula obtained by substituting the calculated $\alpha'$ for $\alpha$ in the above formula (1) when the correction determining means determines that the calculated $\alpha$ is an integer, whereas to calculate the output image data O(x,y) on the basis of the above formula (1) when the correction determining means determines that the calculated $\alpha$ is not an integer.

2. An image processing system having an output image calculating means which receives an input gradient number m, input image data I(x,y) whose input gradient number is m, and an output gradient number n and calculates output image data O(x,y) having an output gradient number of n on the basis of the following formula (1), $$O(x,y)=int[\alpha+d(xd,yd)/(gmax+1)] \quad (1)$$

wherein $\alpha=(n-1)/(m-1)*I(x,y)$, gmax represents the maximum value of the dither matrix, d(xd,yd) represents the value of the dither matrix ($0\leq d(xd,yd)\leq gmax$), xd=x mod dsize_x, yd=y mod dsize_y, dsize_x represents the size of the dither matrix in x direction, and dsize_y represents the size of the dither matrix in y direction, wherein the improvement comprises correction determining means which determines whether $\beta$ calculated according to the following formula (2) is an integer on the basis the input gradient number m, the output gradient number n and a prospective input image value K which the input image data I(x,y) can take, for each value of the prospective input image value K, and obtains in advance the result of determination for each value of the prospective input image value K, a correction means which makes a correction to make $\beta$ not an integer to calculate $\beta'$ when the correction determining means determines that $\beta$ is an integer, and an operation control means which controls the output image calculating means to calculate the output image data O(x,y) on the basis of a formula obtained by substituting $\beta'$ calculated by the correction means for $\alpha$ in the above formula (1) when the input image data I(x,y) received by the output image calculating means is of one of the values of the prospective input image value K for which the correction determining means determines that $\beta$ is an integer, whereas to calculate the output image data O(x,y) on the basis of a formula obtained by substituting $\beta$ for $\alpha$ in the above formula (1) or the above formula (1) when the input image data I(x,y) received by the output image calculating means is not of one of the values of the prospective input image value K for which the correction determining means determines that $\beta$ is an integer $$\beta=(n-1)/(m-1)*K \quad (2).$$

* * * * *